Nov. 6, 1934.  A. P. SCHNEIDER  1,980,101
HEAD DOWN PERSUADER
Filed Jan. 6, 1934
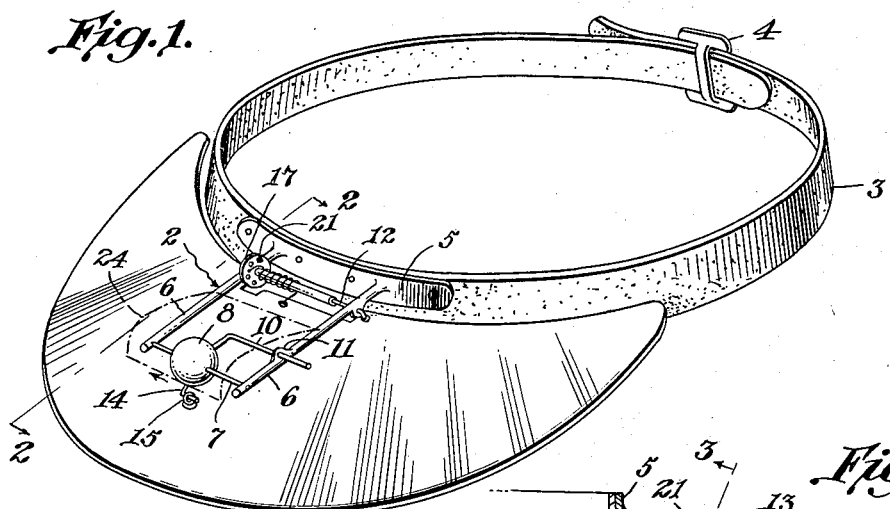
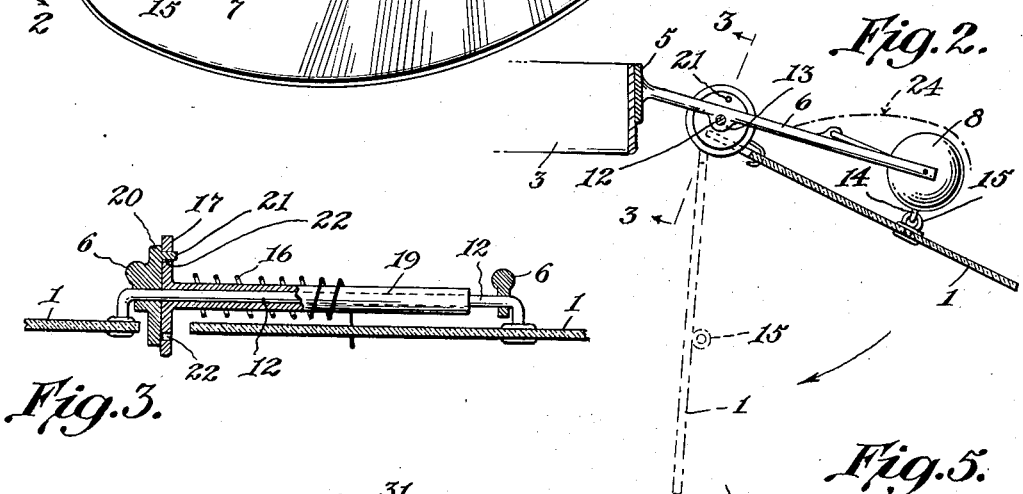
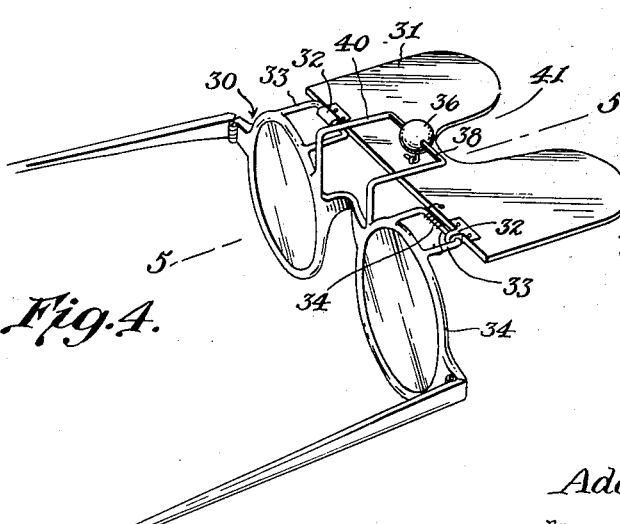
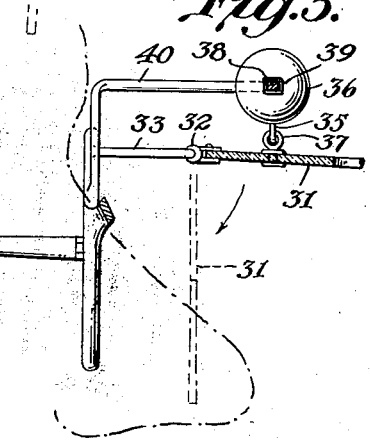
Inventor
Adolph P. Schneider
By Eugene H. Purdy
his Attorney Patented Nov. 6, 1934

1,980,101

UNITED STATES PATENT OFFICE 1,980,101

HEAD-DOWN PERSUADER

Adolph P. Schneider, Allentown, Pa.

Application January 6, 1934, Serial No. 705,639

17 Claims. (Cl. 2—10)

This invention relates to eye screens, and particularly to an eye screen adapted to be worn upon the head normally beyond the field of vision of the wearer but operable by a sharp movement of the head to bring the screen into vision-intercepting position.

More especially the object of the invention is to provide a device, which I term a head-down persuader, useful to golf players in guarding against, or breaking themselves of, the very common and disastrous habit of jerking the head in the intended direction of a golf shot, before completing the full follow-through motion of the stroke, to watch the ball as it leaves its position. This habit, which tends to spoil the accuracy of golf shots, is easily acquired, and once acquired is very difficult to break. By means of my invention a player is repeatedly reminded of his weakness—and thereby assisted in overcoming it—through the operation of a screen or shutter which is automatically flashed before his eyes when a golf stroke is improperly executed.

Preferably the screen assumes the form of a visor or sun shade which, besides serving a useful purpose of itself, also acts to disguise the nature of the device as a prompter or persuader and relieve the wearer from any feeling of conspicuousness. The device may be worn upon the head of a player in any suitable manner, the screen being normally latched in raised position out of his range of vision and so designed that upon a jerk of the head in a side-wise direction a control member is actuated to release the latch and permit the screen to snap downward, under the influence of a spring, into vision-intercepting position. The spring is advantageously provided with mechanism for regulating its tension so as to vary the sensitivity of the device.

The invention will be more clearly understood and its further aims and advantages more fully comprehended from a consideration of the following detailed description of two preferred embodiments, reference being had to the annexed sheet of drawing in which:

Figure 1 is a perspective view of the head-down persuader of the invention;

Figure 2 is a sectional view of the device taken on the line 2—2 of Fig. 1;

Figure 3 is a part sectional view of the spring-tensioning mechanism taken on the line 3—3 of Fig. 2;

Figure 4 is a perspective view of another form of head-down persuader mounted upon a spectacle frame and embodying the principles of the invention; and Figure 5 is a sectional view of the device shown in Fig. 4 taken on the line 5—5 of that figure.

Referring to the embodiment of the invention illustrated in Figs. 1, 2 and 3, a screen 1, preferably of some stiff, translucent, tinted material, such as green celluloid, is mounted upon a frame, designated generally by the numeral 2, which frame in turn is carried upon a flexible head-band 3, on the order of those used for sun shades. This band is adjustable to the size of the head of a golf player by means of a buckle 4, or the head-band may be made in various sizes, as is found most expedient. Upon that section of the head-band which engages the forehead of the player, the frame 2 is fastened. This frame includes a plate 5 riveted or otherwise permanently attached to the head-band and having a pair of spaced arms 6 rigidly united with the plate and extending outwardly and downwardly therefrom at a slight inclination, as best shown in Fig. 2.

Bridging the space between the outer ends of the arms 6 is a cross-bar 7 upon which is slidably mounted a metal ball 8, constituting an inertia member. This ball is made of such size and weight as to provide the desired inertia. The ball 8 is provided with a diametrical passage through which the cross-bar 7 loosely extends, the arrangement being such that upon any sudden or jerky movement of the device which produces a component of motion in a right-hand direction (as viewed in Fig. 1) parallel to the cross-bar, the latter will slip freely through the diametrical passage of the ball 8 which, because of its inertia, tends to remain stationary. Rotation of the ball upon the cross-bar is prevented by a right-angularly bent guide wire 10 having one of its ends connected to the ball and its other end slidable through an aperture provided within an ear 11 upon one of the arms 6.

The screen 1, which assumes the form of a visor, is provided midway between its ends, and upon its margin lying in proximity with the head-band 3, with a transversely-extending shaft 12, the ends of which are down-turned and suitably secured to the screen. This shaft 12 extends across the arms 6 and is rotatably supported within bearings 13 provided thereon, by which construction the screen is capable of swinging up and down through a limited arc as indicated in Fig. 2. The screen is normally maintained in raised position by means of a latch comprising a hook 14, screwed into or otherwise fastened to the metal ball 8, and an eye 15 secured to the screen and engageable with the hook. As will be obvious, when the device is moved sharply to the right (Fig. 1), the eye will be retracted from the hook allowing the screen to fall into the dotted-line position of Fig. 2. Also it will be clear that the device will be unaffected by sudden movements up or down or in a left-hand direction since the hook is free to withdraw from the eye only in a right-hand direction. In order to adapt the device to respond to quick movements to the left (as is necessary when the device is to be used by left-handed golfers), it is only necessary to impart a half turn to the hook so that it enters the eye from a direction opposite to that shown in Fig. 1.

To insure the instantaneous operation of the device, and for other reasons to be explained, I provide resilient means for urging the screen downwardly. Accordingly, a coil spring 16 encircling the shaft 12 has one of its ends connected to the screen 1 and its other end fastened to a thumb plate 17 rotatably mounted upon the shaft. The thumb plate is formed with a reduced tubular extension 19 disposed within the interior of the coil spring and sheathing the shaft 12 so as to protect it against frictional engagement with the spring.

The function of the spring is not only to bias the screen 1 downwardly, but also to exert a longitudinal thrust against the thumb plate 17 and press the latter into contact with a companion plate 20 fixedly mounted upon one of the arms 6. The plate 20 has a pin 21 projecting from its face adapted to be accommodated within any one of a series of recesses 22 arranged in spaced circular formation upon the thumb plate. By sliding the thumb plate along the shaft 12 so as to disengage the pin from a recess and then rotating the thumb plate so as to bring any other one of the recesses into seating engagement with the pin, the tension of the spring may be either increased or diminished as desired. Since the tension of the spring determines the bearing pressure between the hook 14 and eye 15, this tension-adjusting mechanism is advantageous because it permits regulating the sensitivity or degree of responsiveness of the device to sudden movements.

In use, the head-band supporting the device is worn engaging the forehead of the player with the screen 1 latched in upraised position and serving as a sun shade. In correctly executing a golf shot the player follows his (or her) stroke through with a smooth continuous motion, pivoting at the waist and gradually bringing his head erect at the conclusion of the stroke without any semblance of jerkiness which interferes with the accuracy of the shot. Consequently when such a golf shot is properly made, the control mechanism governing the release of the screen is not actuated and the screen remains undisturbed.

When, however, a stroke is not completely followed through but is cut short by the player jerking his head erect prior to, or just after his club meets the ball on the tee, then the ensuing sharp movement of the device to the right (assuming the player to be right-handed) causes the cross-bar 7 to slide through the passage in the inertia member 8. This relative displacement of the ball and the frame causes disengagement of the eye 15 from the hook 14 and allows the screen to snap down in front of the eyes of the player which signals to him the fact that he has failed to execute the stroke properly. By virtue of being repeatedly reminded of his error (which he might otherwise not suspect) coincident with its occurrence, the player, after a short time will have impressed upon his mind the necessity of keeping his head down while making a shot.

The device may be reconditioned for use on a succeeding stroke without removing it from the head by simply returning the screen to raised position with one hand and shifting the metal ball 8 along the cross-bar 7 with the same or the other hand until the hook 14 engages the eye 15. Some players may prefer a more sensitive operation of the device than others, or the spring 16 may become fatigued with age so as to lose some of its resilience. In such circumstances the tension of the spring may be varied by adjusting the thumb plate 17 in a manner which has already been explained.

The manner of supporting the device upon a head-band as above described, it will be appreciated, is simply by way of illustration, and the device may be carried upon the head in any other suitable manner. For example, the device may be mounted upon or embodied in a cap, the screen defining a visor or beak and operable in the manner already described. Under some circumstances, and particularly where the device is supported upon a cap, it may be found desirable to provide a protective shield for the latch mechanism, and such a shield may comprise a curved strip of thin sheet metal 24 fastened to the arms 6 and overhanging the cross-bar 7 above the ball 8 as indicated by dotted lines in Figs. 1 and 2.

In Figs. 4 and 5 is illustrated a slightly modified form of head-down persuader, but corresponding in fundamental respects to the one just described. In this embodiment of the invention, the device instead of being carried upon a head-band is mounted instead upon a spectacle frame 30. The screen 31 is hinged as at 32 to a pair of forwardly extending brackets 33 and biased downwardly by a coil spring 34 encircling a bracket and having one of its ends attached to a stationary part of the frame and its other end connected to the screen.

The screen is normally held in raised position, so as to define a visor above the spectacle frame, by means of a latch comprising a hook 35 depending from a metal ball 36, which hook engages an eye 37 fastened to the screen. As best shown in Fig. 5 the ball 36 is provided with a diametrical passage 38 of angular cross-section which is traversed by a cross-bar 39 suspended between the two free ends of a pair of forwardly projecting arms 40 united with the spectacle frame 30. The cross-bar 39 corresponds in cross-section to that of the passage 38 but is of slightly reduced dimensions in order that the ball may freely slide along the cross-bar. The angular cross-sectional conformation of the passage and cross-bar prevents rotation of the ball upon the cross-bar and dispenses with the necessity of providing additional structure, such as the guide wire 10 described in connection with the device of Figs. 1 to 3, to accomplish this end. The screen in this construction is formed with an intermediate cut-away portion, as indicated at 41, affording clearance for the nose of the wearer when the screen assumes its lowered position, as indicated by dotted-lines in Fig. 5.

The operation of this form of head-down persuader is essentially the same as the one previously described. The spectacle frame is supported upon the nose, screen 31 projecting outwardly above the eyes of the player and serving as a sun shade. When the device is subjected to a sudden jerk in a sidewise direction of sufficient magnitude to slip the eye 37 from the hook 35, the spring 34 throws the screen 31 downwardly into vision-intercepting position. The device is re-set for subsequent use by raising the screen into its original horizontal position and sliding the ball 38 along the cross-bar 39 until the hook 35 again engages the eye 37.

It is not necessary in this form of the device that the spectacle frame 30 upon which the device is carried be provided with lenses. Instead the lense holders of the frame may be fitted with common window glass, or some other transparent material, or even may be left open. This permits the construction of the device to be standardized so as to best answer the requirements of the general public. At the same time, the device may be worn in conjunction with and in front of a pair of spectacles when this is necessary or desirable.

Manifestly many changes in construction and design may be made without departing from the spirit of the invention. It will be appreciated that the features of the two embodiments of the invention described above may be interchangeably employed. For example, in lieu of the guide wire 10 shown in the device of Figs. 1 and 2, a ball 8 having an angular passage to receive a cross-bar of corresponding cross-section may desirably be substituted; and, of course, a guide wire may be substituted in the device of Figs. 4 and 5 in place of the angular cross-bar 38. The same is true of the spring-tensioning mechanism of Figs. 1 to 3, inclusive, which may be included or omitted, as desired.

While the device is intended primarily for use as a head-down persuader for golf players, it has other advantageous applications. It may, for example, find utility as an eye protector for motorists (for night driving), foundrymen, welders, and others, adapted to be instantaneously brought into play while the hands are engaged by a mere shake of the head. In this connection the function of the tinted screen will be to filter out the glare of blinding lights. Or the screen, in its broader sense, may be composed of or carry other types of material such as optical glass, having vision-correcting or magnifying properties, an important advantage of the invention being to provide a simple, quick and positive means for bringing a screen of any suitable material and having any desired properties before the eyes without requiring the use of the hands.

I claim:

1. A device of the character described comprising a support adapted to be worn upon the head, a screen associated with the support and means positively maintaining said screen normally disposed beyond the field of vision of the wearer, and control means operable by a jerk of the head for releasing said screen and causing said screen to intercept the field of vision.

2. A device of the character described comprising a support adapted to be worn upon the head, a screen associated with the support, a latch normally retaining said screen beyond the field of vision of the wearer, and control means so constructed and arranged to be operable by a jerk of the head for releasing said latch and permitting said screen to intercept the field of vision.

3. A device of the character described comprising a support adapted to be worn upon the head, a screen associated with the support, a latch normally retaining said screen beyond the field of vision of the wearer, resilient means urging said screen toward vision-intercepting position, and control means so constructed and arranged to be operable by a jerk of the head for releasing said latch and permitting said screen to intercept the field of vision.

4. A device of the character described comprising a support adapted to be worn upon the head, a screen associated with the support, a latch normally retaining said screen beyond the field of vision of the wearer, resilient means urging said screen toward vision-intercepting position, and control means so constructed and arranged to be operable by a sidewise jerk of the head for releasing said latch and permitting said screen to intercept the field of vision.

5. A device of the character described comprising a support adapted to be worn upon the head, a screen associated with the support, a latch normally retaining said screen beyond the field of vision of the wearer, a spring urging said screen toward vision-intercepting position, an adjustable member for varying the tension of the spring, and control means so constructed and arranged to be operable by a sidewise jerk of the head for releasing said latch and permitting said screen to intercept the field of vision.

6. A device of the character described comprising a support adapted to be worn upon the head, a screen associated with the support a latch normally retaining said screen beyond the field of vision of the wearer, resilient means for developing frictional resistance to the actuation of said latch, means for adjusting the tension of the resilient means, and control means so constructed and arranged to be operable by a sidewise jerk of the head for releasing said latch and permitting said screen to intercept said field of vision.

7. A device of the character described comprising a support adapted to be worn upon the head, a screen defining a visor associated with the support, said screen being mounted so as to move into and out of the field of vision of the wearer, and control means so constructed and arranged for normally retaining said screen beyond vision-intercepting position but permitting said screen to move into vision-intercepting position upon a sidewise jerk of the head.

8. A device of the character described comprising a support adapted to be worn upon the head, a screen defining a visor associated with the support, said screen being mounted so as to move into and out of the field of vision of the wearer, a latch for normally retaining said screen beyond the field of vision, and control means so constructed and arranged for releasing said latch and permitting said screen to move into vision-intercepting position.

9. A device of the character described comprising a support adapted to be worn upon the head, a screen defining a visor associated with the support, said screen being pivotally mounted so as to swing into and out of the field of vision of the wearer, means urging said screen into vision-intercepting position, a latch for normally retaining said screen beyond vision-intercepting position and control means so constructed and arranged to be operable upon a sidewise jerk of the head for releasing said latch and permitting said screen to swing into vision-intercepting position.

10. A device of the character described comprising a support adapted to be worn upon the head, a screen mounted upon the support so as to move into and out of the field of vision of the wearer, and control means for said screen comprising an inertia member movably mounted upon said frame and normally engaging said screen to retain it out of vision-intercepting position, said inertia member and frame being relatively displaceable upon a jerk of the head to disengage the screen and permit said screen to move into vision-intercepting position.

11. A device of the character described comprising a support adapted to be worn upon the head, a screen mounted upon the support so as to move into and out of the field of vision of the wearer, resilient means urging said screen toward vision-intercepting position and a control member for said screen comprising an inertia member movably mounted upon said frame, and a latch connecting said screen to said inertia member and normally retaining the screen beyond vision-intercepting position, said inertia member and frame being relatively displaceable upon a sidewise jerk of the head to release said latch and permit the screen to snap into vision-intercepting position.

12. A device of the character described comprising a support adapted to be worn upon the head, a screen defining a visor mounted upon the support, said screen being movable into and out of the field of vision of the wearer, a spring urging said screen toward vision-intercepting position and a control member for said screen comprising an inertia member movably mounted upon said frame, a latch interposed between said inertia member and screen and normally retaining the screen beyond vision-intercepting position, said inertia member and frame being relatively displaceable upon a sidewise jerk of the head to release said latch, and means for adjusting the tension of the spring to vary the sensitivity of the device to jerks.

13. A device of the character described comprising a band adapted to be worn about the head, a support connected to said band, a screen defining a visor pivotally mounted upon the support beyond the field of vision of the wearer, resilient means urging said screen toward vision-intercepting position and a control member for said screen comprising an inertia member transversely slidable upon said frame, a latch connecting said screen to said inertia member and normally retaining the screen out of vision-intercepting position, said inertia member and frame being relatively displaceable upon a sidewise jerk of the head to release said latch and permit the screen to snap into vision-intercepting position.

14. A device of the character described comprising a spectacle frame, a screen mounted upon said frame and movable into and out of the field of vision of the wearer, a latch for normally retaining said screen beyond vision-intercepting position, and control means so constructed and arranged to be operable upon a jerk of the head for releasing said latch and permitting said screen to move into vision-intercepting position.

15. A device of the character described comprising a spectacle frame, a screen mounted upon said frame and movable into and out of the field of vision of the wearer, a latch for normally retaining said screen out of vision-intercepting position, and control means including an inertia member operable upon a sidewise jerk of the head for releasing said latch and permitting said screen to move into vision-intercepting position.

16. A device of the character described comprising a spectacle frame, a screen mounted upon said frame and movable into and out of the field of vision of the wearer, resilient means urging said screen toward vision-intercepting position, a latch for normally retaining said screen beyond vision-intercepting position and control means including an inertia member for releasing said latch and permitting said screen to snap into vision-intercepting position, said inertia member and frame being relatively displaceable upon a sidewise jerk of the head.

17. A device of the character described comprising in combination a spectacle frame and a screen pivoted to and projecting outwardly from the frame so as to define a visor therefor, said screen being movable into and out of the field of vision of the wearer, resilient means urging said screen toward vision-intercepting position, a latch for normally retaining said screen out of vision-intercepting position, and control means including an inertia member for releasing said latch and permitting said screen to snap into vision-intercepting position, said inertia member and frame being relatively displaceable upon a sidewise jerk of the head.

ADOLPH P. SCHNEIDER.